US011334444B2

(12) United States Patent
Hu et al.

(10) Patent No.: US 11,334,444 B2
(45) Date of Patent: May 17, 2022

(54) METHOD, DEVICE AND COMPUTER PROGRAM PRODUCT FOR MANAGING A STORAGE SYSTEM

(71) Applicant: Dell Products L.P., Round Rock, TX (US)

(72) Inventors: Bernie Hu, Chengdu (CN); Vicent Wu, Chengdu (CN); Olivia Juan Huang, Chengdu (CN); Amber Jing Li, Chengdu (CN); Ying Yu, Chengdu (CN)

(73) Assignee: Dell Products L.P., Round Rock, TX (US)

(*) Notice: Subject to any disclaimer, the term of this patent is extended or adjusted under 35 U.S.C. 154(b) by 855 days.

(21) Appl. No.: 16/174,621

(22) Filed: Oct. 30, 2018

(65) Prior Publication Data

US 2019/0220371 A1    Jul. 18, 2019

(30) Foreign Application Priority Data

Jan. 18, 2018  (CN) .......................... 201810050473.0

(51) Int. Cl.
*G06F 11/14* (2006.01)
*G06F 11/10* (2006.01)

(52) U.S. Cl.
CPC ...... *G06F 11/1469* (2013.01); *G06F 11/1471* (2013.01); *G06F 11/1076* (2013.01); *G06F 2201/80* (2013.01)

(58) Field of Classification Search
CPC ............. G06F 11/1469; G06F 11/1471; G06F 11/1076; G06F 2201/80
See application file for complete search history.

(56) References Cited

U.S. PATENT DOCUMENTS 6,425,049 B1 * 7/2002 Yamamoto ............ G06F 3/0626
714/6.21
6,810,396 B1 * 10/2004 Blumenau ........... G06F 11/1464
707/999.005

(Continued)

*Primary Examiner* — Matthew M Kim
*Assistant Examiner* — Indranil Chowdhury
(74) *Attorney, Agent, or Firm* — Ryan, Mason & Lewis, LLP

(57) ABSTRACT

Embodiments of the present disclosure relate to a method, device and computer program product for managing storage systems. A method comprises, in response to receiving a command to recover a storage system, reading first configuration information from a first disk of the storage system to be recovered, the first configuration information indicating a first disk array group to which the first disk belongs. The method further comprises recovering the first disk array group based at least on the first configuration information. The method further comprises, in response to the first disk array group being recovered, reading second configuration information from the first disk array group, the second configuration information indicating a storage resource pool to which the first disk array group belongs. Additionally, the method further comprises recovering the storage resource pool based at least on the second configuration information. Embodiments of the present disclosure can gradually recover various levels of storage objects in the storage system in the event of loss of configuration information in the system database.

22 Claims, 9 Drawing Sheets

(56) References Cited

U.S. PATENT DOCUMENTS

| | | | | |
|---|---|---|---|---|
| 7,487,385 B2* | 2/2009 | Rodrigues | G06F 11/1096 | 714/13 |
| 7,996,708 B1* | 8/2011 | Mohl | G06F 11/1662 | 714/3 |
| 8,006,056 B2* | 8/2011 | Voigt | G06F 3/0613 | 711/170 |
| 8,151,048 B1* | 4/2012 | Premkumar | G06F 3/0605 | 710/305 |
| 8,473,678 B1* | 6/2013 | Rajasekaran | G06F 3/0685 | 711/170 |
| 2001/0047482 A1* | 11/2001 | Harris | G06F 11/0727 | 714/E11.023 |
| 2006/0107103 A1* | 5/2006 | Rodrigues | G06F 11/2094 | 714/6.1 |
| 2009/0164531 A1* | 6/2009 | Tanaka | G06F 11/1662 | |
| 2009/0216973 A1* | 8/2009 | Nakajima | G06F 11/1451 | 711/E12.103 |
| 2011/0087929 A1* | 4/2011 | Koshiyama | G06F 3/0632 | 714/48 |
| 2013/0198466 A1* | 8/2013 | Kono | G06F 3/0605 | 711/161 |
| 2013/0205063 A1* | 8/2013 | Zhang | G06F 11/1456 | 711/E12.008 |
| 2013/0232122 A1* | 9/2013 | Fitzgerald | G06F 8/60 | 707/679 |
| 2014/0122825 A1* | 5/2014 | Kono | G06F 3/0605 | 711/170 |
| 2014/0337665 A1* | 11/2014 | Ogihara | G06F 11/1092 | 714/6.21 |
| 2015/0120670 A1* | 4/2015 | Fitzgerald | G06F 11/1469 | 707/649 |
| 2015/0373111 A1* | 12/2015 | Fukui | H04L 67/1012 | 709/213 |
| 2016/0124666 A1* | 5/2016 | Kono | G06F 3/0619 | 711/114 |
| 2017/0153829 A1* | 6/2017 | Patel | G06F 3/061 | |
| 2019/0004899 A1* | 1/2019 | Gao | G06F 11/1088 | |
| 2019/0332502 A1* | 10/2019 | Ma | G06F 11/008 | |
| 2021/0334014 A1* | 10/2021 | Zhuo | G06F 3/0653 | |

\* cited by examiner

METHOD, DEVICE AND COMPUTER PROGRAM PRODUCT FOR MANAGING A STORAGE SYSTEM

RELATED APPLICATION(S)

The present application claims priority to Chinese Patent Application No. 201810050473.0, filed Jan. 18, 2018 and entitled "Method, Device and Computer Program Product for Managing Storage System," which is incorporated by reference herein in its entirety.

FIELD

Embodiments of the present disclosure generally relate to the field of data storage, and more specifically, to methods, devices and computer program products for managing a storage system.

BACKGROUND

Data recovery refers to a process of rearranging and piecing together data in case that, for example, a storage system storing the data is damaged or the data is deleted by accident. Normally, as long as the data sector on the storage device is not severely damaged, the data can be recovered by recovery techniques. However, in terms of the storage system, data recovery usually requires continued operation of an operating system (OS) that manages the storage system because important configuration information of the storage system is often stored in the corresponding database of the operating system. If the operating system crashes and then is reinstalled, the important configuration information may be lost. In this case, even though the user data stored on the storage device may be not damaged, such data can no longer be rearranged and accessed since the configuration information describing how to organize the storage device and the data has already been lost.

SUMMARY

Embodiments of the present disclosure provide methods, devices and computer program products for managing a storage system.

In a first aspect of the present disclosure, a method is provided for managing a storage system. The method comprises, in response to receiving a command to recover a storage system, reading first configuration information from a first disk of the storage system to be recovered, the first configuration information indicating a first disk array group to which the first disk belongs. The method further comprises recovering the first disk array group based at least on the first configuration information. The method further comprises, in response to the first disk array group being recovered, reading second configuration information from the first disk array group, the second configuration information indicating a storage resource pool to which the first disk array group belongs. Additionally, the method further comprises recovering the storage resource pool based at least on the second configuration information.

In a second aspect of the present disclosure, a method is provided for managing a storage system. The method comprises, in response to creating a storage resource pool in a storage system, recording third configuration information in the storage resource pool, the third configuration information indicating a user storage object created on the storage resource pool, the storage resource pool including at least a disk array group, and the disk array group including at least one disk. The method further comprises recording second configuration information in the disk array group, the second configuration information indicating the storage resource pool including the disk array group and another disk array group included in the storage resource pool. The method further comprises recording first configuration information in the at least one disk, the first configuration information indicating the disk array group including the at least one disk. Additionally, the method further comprises, in response to receiving an indication of configuration update in the storage system, updating at least one of the first, second and third configuration information.

In a third aspect of the present disclosure, a device is provided for managing a storage system. The device comprises at least one processing unit and at least one memory. The at least one memory is coupled to the at least one processing unit and stores instructions for execution by the at least one processing unit. The instructions, when executed by the at least one processing unit, cause the device to perform acts including: in response to receiving a command to recover a storage system, reading first configuration information from a first disk of the storage system to be recovered, the first configuration information indicating a first disk array group to which the first disk belongs; recovering the first disk array group based at least on the first configuration information; in response to the first disk array group being recovered, reading second configuration information from the first disk array group, the second configuration information indicating a storage resource pool to which the first disk array group belongs; and recovering the storage resource pool based at least on the second configuration information.

In a fourth aspect of the present disclosure, a device is provided for managing a storage system. The device comprises at least one processing unit and at least one memory. The at least one memory is coupled to the at least one processing unit and stores instructions for execution by the at least one processing unit. The instructions, when executed by the at least one processing unit, cause the device to perform acts including: in response to creating a storage resource pool in a storage system, recording third configuration information in the storage resource pool, the third configuration information indicating a user storage object created on the storage resource pool, the storage resource pool including at least a disk array group, and the disk array group including at least one disk; recording second configuration information in the disk array group, the second configuration information indicating the storage resource pool including the disk array group and another disk array group included in the storage resource pool; recording first configuration information in the at least one disk, the first configuration information indicating the disk array group including the at least one disk; and in response to receiving an indication of configuration update in the storage system, updating at least one of the first, second and third configuration information.

In a fifth aspect of the present disclosure, a computer program product is provided. The computer program product is tangibly stored in a non-transitory computer-readable storage medium and includes machine executable instructions. The machine executable instructions, when executed by a device, cause the device to carry out the method according to the first aspect of the present disclosure.

In a sixth aspect of the present disclosure, a computer program product is provided. The computer program product is tangibly stored in a non-transitory computer-readable storage medium and includes machine executable instructions. The machine executable instructions, when executed by a device, cause the device to carry out the method according to the second aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description of the example embodiments of the present disclosure with reference to the accompanying drawings, the above and other objectives, features, and advantages of example embodiments of the present disclosure will become more apparent. In the example embodiments of present disclosure, the same reference numerals usually represent the same components.

In each drawing, the same or corresponding reference numerals refer to the same or corresponding components.

DETAILED DESCRIPTION OF EMBODIMENTS

The preferred embodiments of the present disclosure will be described in more detail with reference to the drawings. Although the drawings illustrate the preferred embodiments of the present disclosure, it should be appreciated that the present disclosure can be implemented in various manners and should not be limited to the embodiments explained herein. To the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first," "second" and so on can refer to the same or different objects. The following text can comprise other explicit and implicit definitions.

As described above, in traditional storage systems, configuration information of the storage system is typically stored in a corresponding database of an operating system that manages the storage system. If the operating system crashes and is then reinstalled, the important configuration information may be lost. As a result, the data in the storage system cannot be recovered.

Example embodiments of the present disclosure provide a solution for managing a storage system. While creating and updating various levels of storage objects in the storage system, in addition to storing corresponding configuration information in the system database, the solution also dispersedly records the corresponding configuration information into the various levels of storage objects. For example, in the case that the operating system for managing the storage system crashes and then is reinstalled, although the configuration information in the system database may be lost, this solution can still read the recorded corresponding configuration information from the storage device and recover the storage objects in the storage system level by level based on the read configuration information, as long as the data sector on the storage device is not severely damaged.

Moreover, by updating the database of the operating system with the read configuration information, the solution can implement recovery for data in the entire storage system. In this way, when the operating system that manages the storage system is reinstalled, or the storage device in the storage system is moved to another storage system with the same architecture, user data and configuration information stored in the storage device can be recovered and rebuilt.

Figure 1:
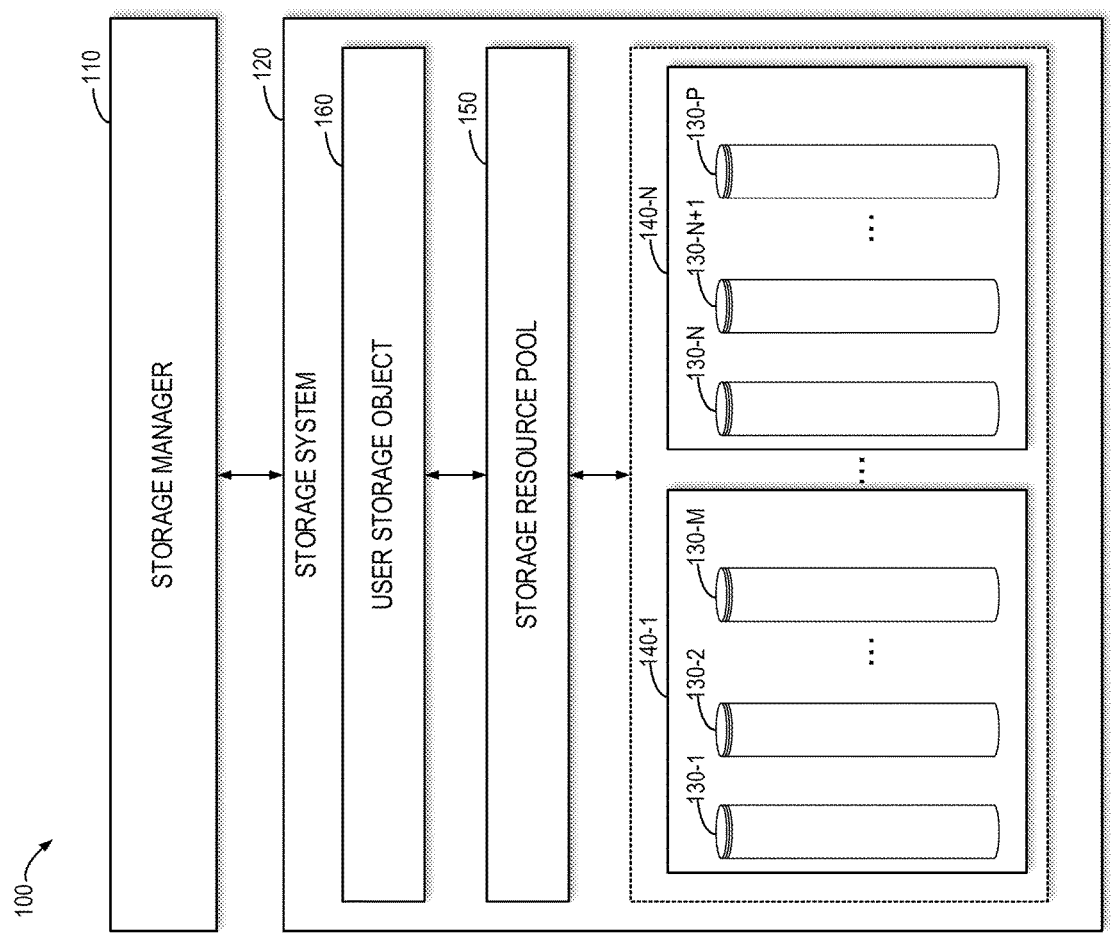
FIG. 1 illustrates a block diagram of an environment in which embodiments of the present disclosure can be implemented.

FIG. 1 illustrates a block diagram of an environment 100 in which embodiments of the present disclosure can be implemented. As shown in FIG. 1, the environment 100 may include a storage manager 110 and a storage system 120. The storage manager 110 may manage the storage system 120. It is to be understood that structure and functions of the environment 100 are described only for the purpose of illustration, without suggesting any limitation to the scope of the present disclosure. The present disclosure can be implemented in other environments than the environment 100.

In some embodiments, the storage system 120 may include a plurality of storage disks 130-1, 130-2 . . . 130-M . . . 130-N, 130-N+1 . . . 130-P (collectively referred to as storage disks 130) as shown in FIG. 1. As used herein, a "storage disk" can refer to any non-volatile storage medium currently known or to be developed in the future, such as magnetic disk, optical disk or Solid-State Disk (SSD) and the like.

In some embodiments, for example, a user of the storage system 120 may organize the plurality of storage disks 130 into one or more disk array groups 140-1, 140-2 . . . 140-N (collectively referred to as disk array group(s) 140) via the storage manager 110. The disk array group 140, for example, can be a Redundant Array of Independent Disks (RAID), which normally combines a plurality of physical storage units into logic storage units for the purpose of data redundancy and/or performance improvement. According to the required redundancy and performance level, the disk array group 140 can have different RAID types, such as RAID 0, RAID 1 . . . RAID 5 and so on.

Additionally, in some embodiments, one or more disk array groups 140 can be, for example, organized via the storage manager 110 into a storage resource pool 150, which includes a group of logic storage units provided by the disk array groups 140. The user may create one or more user storage objects 160 on the storage resource pool 150 for the use of a specific application (not shown). Examples of a user storage object may include, but are not limited to, Logic Unit Number (LUN), file system etc. For the purpose of facilitating description, FIG. 1 only illustrates one storage resource pool 150 and one user storage object 160. However, it is to be understood that embodiments of the present disclosure can also be embodied in different numbers of disks, disk array groups, storage resource pools and/or user storage objects, and the scope of the present disclosure is not restricted in this regard.

The storage manager 110 can manage the storage system 120. In some embodiments, the storage manager 110 may operate an operating system for managing the storage system 120. In traditional solutions, the operating system that manages the storage system may usually provide a user interface (UI) module for performing various operations (e.g., creating, updating and destroying the storage objects and the like) on the storage system. In addition, the operating system that manages the storage system may usually also provide a system database for saving configuration information of the storage system. For example, when the user creates a certain storage object via the UI module, the UI module may invoke a corresponding Application Program Interface (API) to store the configuration information about the storage object into the system database. In some embodiments, the storage manager 110 as shown in FIG. 1 is compatible with the above traditional solutions. That is, the storage manager 110 may also operate the above UI module and the system database. Additionally, the storage manager 110 may also operate one or more additional management modules, to perform the solution for managing a storage system according to embodiments of the present disclosure.

Figure 2:
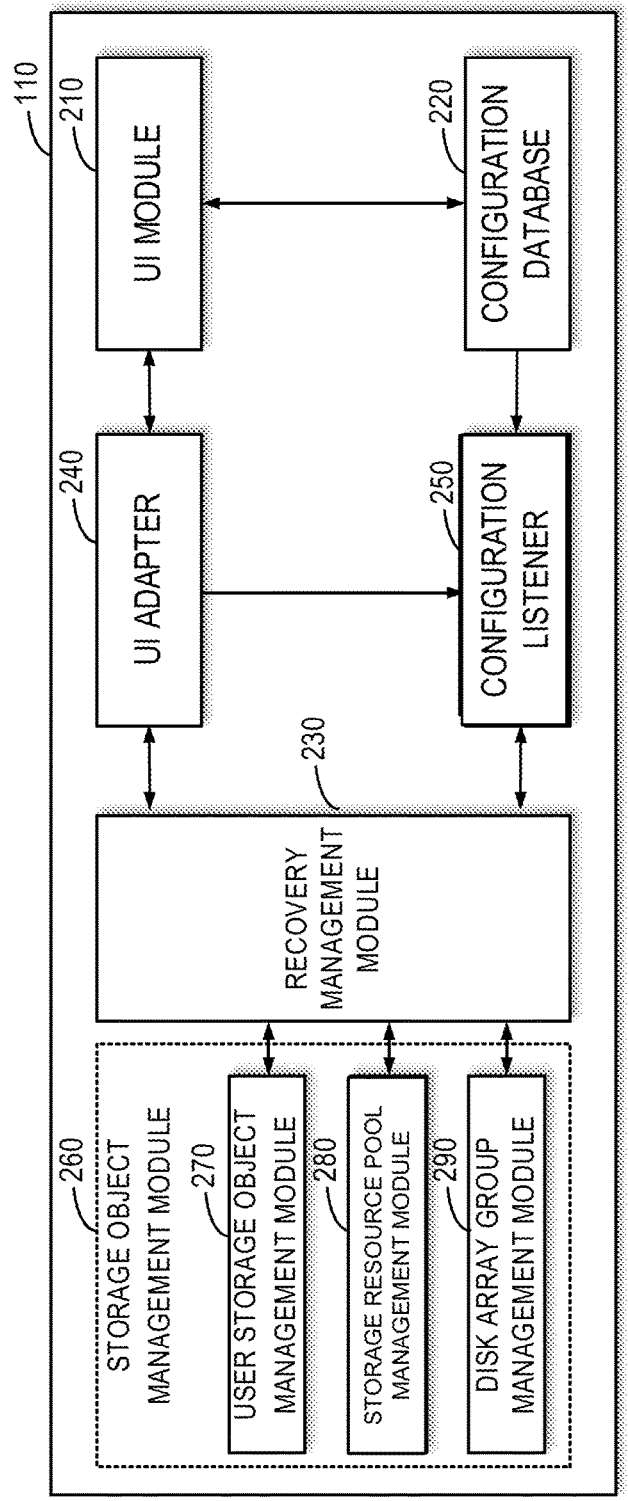
FIG. 2 illustrates a schematic block diagram of a storage manager for managing the storage system according to embodiments of the present disclosure.

FIG. 2 illustrates a schematic block diagram of the storage manager 110 for managing the storage system 120 according to embodiments of the present disclosure. It is to be understood that structure and functions of the storage manager 110 are described only for the purpose of illustration, without suggesting any limitation to the scope of the present disclosure. Embodiments of the present disclosure can be embodied in different structures and/or functions.

As shown in FIG. 2, the storage manager 110 can operate a UI module 210 and a configuration database 220. As described above, the UI module 210 and the configuration database 220 can be compatible with the traditional solutions without making any modifications. For example, when a user creates a certain storage object (such as a disk array group, a storage resource pool or a user storage object based on the storage resource pool and the like) in the storage system 120 via the UI module 210, the UI module 210 can invoke a corresponding API to store configuration information about the storage object in the configuration database 220. When the user performs various operations (e.g., creating, updating and destroying the storage objects and the like) on the storage system 210 via the UI module, the UI module 210 can invoke a corresponding API to update the configuration information as stored in the configuration database 220.

In some embodiments, in order to implement the solution for managing a storage system according to embodiments of the present disclosure, especially to implement OS independent data recovery for the storage system, the storage manager 110 may also operate one or more additional modules. For example, as shown in FIG. 2, apart from the UI module 210 and the configuration database 220, the storage manager 110 may also include a recovery management module 230, a UI adapter 240, a configuration listener 250 and a storage object management module 260. The storage object management module 260 may include a user storage object management module 270, a storage resource pool management module 280 and a disk array group management module 290.

As shown in FIG. 2, in some embodiments, the UI adapter 240 may be coupled to the UI module 210 or combined with the UI module 210. For example, the UI adapter 240 may be integrated into the UI module 210. In some other embodiments, the UI adapter 240 can also be a module separated from the UI module 210. The UI adapter 240 may be used to adapt to current user interface operations. For instance, the UI adapter 240 may capture an update of configuration information of storage objects caused by various operations performed through the UI module 210. For example, if the user performs various operations (e.g., creating, updating and destroying the storage objects and the like) via the UI module 210, the operations may result in update of configuration information and update of various storage objects. The UI adapter 240 may capture such configuration information update and transfer it to the configuration listener 250 or the recovery management module 230 to perform corresponding operations for the configuration information update. Additionally, the UI adapter 240 may also provide APIs, such as for maintaining configuration update, triggering data recovery of the storage system, or rolling back a state of the storage system. The UI adapter 240 may also cooperate with the UI module 210 in a replay operation that performs data recovery of the storage system (as will be further described below, as used herein, a "replay operation" refers to operations of updating the configuration database 220 with corresponding configuration information read from the various levels of storage objects during data recovery).

In some embodiments, the configuration listener 250 may monitor properties and status updates of various storage objects (such as disks, disk array groups, storage resource pools and user storage objects) in the configuration database 220. The configuration listener 250 may request these updates from the configuration database 220, and transmit these updates to the recovery management module 230 for storage at predetermined locations in the various storage objects. The configuration listener 250, for example, may have two working modes: active mode (also known as "schedule mode") and passive mode (also known as "instant mode").

In the active mode, the configuration listener 250 can periodically scan the configuration database 220 at a configurable time interval to capture configuration information updates that are not from the UI adapter 240, such as disk failure, enclosure outage etc. The configuration listener 250 can transmit these updates to the recovery management module 230 for storage at predetermined locations in the various storage objects.

In the passive mode, the configuration listener 250 can transmit, in response to receiving configuration information updates from the UI adapter 240, the updates to the recovery management module 230 for storage at predetermined locations in the various storage objects. In some embodiments, the configuration listener 250 can work in the active mode by default. When the configuration listener 250 receives information from the UI adapter 240, the active mode can be interrupted such that the configuration listener 250 enters the passive mode. When a configuration information update from the UI adapter 240 is transmitted to the recovery management module 230, the configuration listener 250 can go back to the active mode.

In some embodiments, the recovery management module 230 may manage corresponding configuration information of various levels of storage objects related to the storage resource pool 150 as shown in FIG. 1. The various levels of storage objects, for example, may include the disks 130, the disk array groups 140, the storage resource pool 150 and the user storage objects 160.

In some embodiments, the recovery management module 230 can manage configuration information (also known as "first configuration information") describing relationships between the disks 130 and the disk array groups 140 via the disk array group management module 290. The first configuration information, for example, can be stored at a specific location of each disk 130 by the disk array group management module 290. The disk array group management module 290 can allocate a global unique identifier (ID) to each disk array group 140, such that the disk array group 140 is movable among different storage systems. The disk array group management module 290 can manage configuration information updates associated with creation, rebuild (such as disk replacement) and/or destroying of the disk array groups 140.

In some embodiments, the recovery management module 230 can manage the configuration information (also known as "second configuration information") describing relationships between the disk array groups 140 and the storage resource pool 150 via the storage resource pool management module 280. The second configuration information, for example, can be stored in a specific location of each disk array group 140 by the storage resource pool management module 280. The storage resource pool management module 280 can allocate a global unique identifier (ID) to each storage resource pool 150, such that the storage resource pool 150 can be movable among different storage systems. The storage resource pool management module 280 can manage configuration information updates associated with creation, expansion and/or destroying of the storage resource pool 150.

In some embodiments, the recovery management module 230 may manage configuration information (also known as "third configuration information") describing relationships between the storage resource pool 150 and the user storage objects 160 via the user storage object management module 270. The third configuration information, for example, can be stored in a specific location of the storage resource pool 150 by the user storage object management module 270. The user storage object management module 270 can manage configuration information updates associated with configuration or status changes of any user storage object 160.

In some embodiments, the recovery management module 230 may have two working modes: synchronization mode and recovery mode. The recovery management module 230, while in the synchronization mode, for example, when the storage resource pool 150 is created, can obtain corresponding information from the UI adapter 240 and/or the configuration listener 250, so as to initialize corresponding configuration information of various levels of storage objects and record the corresponding configuration information in respective locations of the various levels of storage objects. When the user performs various operations (e.g., creating, updating and destroying the storage objects and the like) via the UI module, the recovery management module 230 can obtain corresponding information from the UI adapter 240 and/or configuration listener 250, so as to correspondingly update the respective configuration information stored in the various levels of storage objects.

When the recovery mode is triggered (e.g., the UI adapter 240 may provide a corresponding API to the UI module 210, such that the user can trigger data recovery via the UI module 210), the recovery management module 230 can read the recorded corresponding configuration information from various storage objects, and gradually recover the storage objects level by level based on the read configuration information. The detailed procedures of the synchronization mode and recovery mode of the recovery management module 230 will be further described with reference to FIGS. 3-6.

Figure 3:
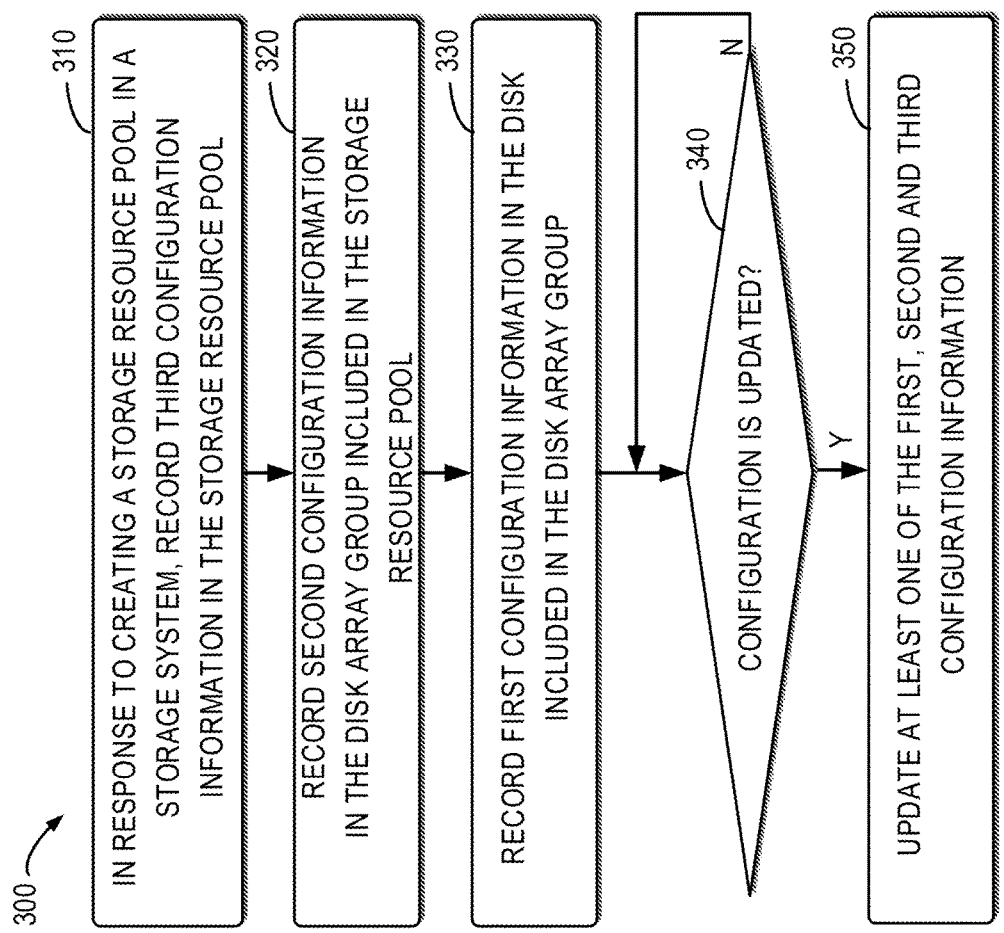
FIG. 3 illustrates a flowchart of a method for managing a storage system according to embodiments of the present disclosure.

FIG. 3 illustrates a flowchart of a method 300 for managing a storage system according to embodiments of the present disclosure. For example, the method 300 can be executed by the storage manager 110 as shown in FIGS. 1 and 2. Specifically, the method 300, for example, can be executed by the recovery management module 230 in synchronization mode. It is to be understood that the method 300 may also include additional acts not shown and/or omit some acts as shown, and the scope of the present disclosure is not restricted in this regard. The method 300 will be described in detail with reference to FIGS. 1 and 2.

At block 310, in response to creation of the storage resource pool 150 in the storage system 120, the recovery management module 230 can record the third configuration information in the storage resource pool 150.

In some embodiments, the recovery management module 230 can obtain from the UI adapter 240 and/or configuration listener 250 the information that the storage resource pool 150 is created. The information, for example, can indicate configuration information of various storage objects associated with the created storage resource pool 150. For example, it can indicate that the created storage resource pool 150 includes one or more disk array groups 140, where each of the disk array groups 140 includes one or more disks 130. In response to obtaining such information, the recovery management module 230 can record the third configuration information in the storage resource pool 150 via the user storage object management module 270.

In some embodiments, the third configuration information can indicate user storage objects created on the storage resource pool 150. In some cases, when the storage resource pool 150 is initially created, the user may have not created any user storage object yet. In this case, the recovery management module 230 may initialize the third configuration information only (such as by allocating spaces and assigning initial values for the third configuration information, and the like).

Figure 4A:
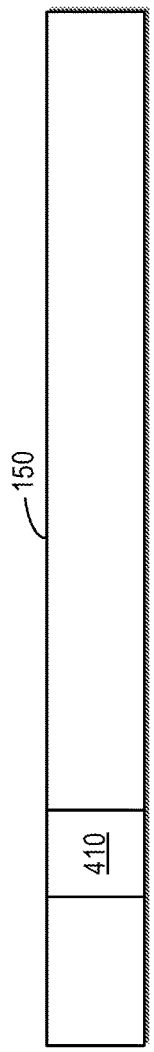
FIGS. 4A-4C illustrate schematic diagrams of corresponding configuration information for various levels of storage objects of the storage system according to embodiments of the present disclosure.

FIG. 4A illustrates a schematic diagram of third configuration information 410 recorded in the storage resource pool 150 according to embodiments of the present disclosure. As shown in FIG. 4A, the storage resource pool 150, for example, may include a group of logic storage units provided by the disk array group 140, and the third configuration information 410, for example, may be stored at a predetermined address in the storage resource pool 150. In some embodiments, a predetermined size (for example, 512 megabytes) of space may be allocated at a predetermined address of the storage resource pool for storing the third configuration information 410. The third configuration information 410, for example, can indicate the user storage objects 160 created on the storage resource pool 150. When data recovery is performed on the storage system, the third configuration information 410 can be used for recovering the user storage objects 160.

Returning to FIG. 3, at block 320, the recovery management module 230 may record the second configuration information in each of the disk array groups 140 included in the storage resource pool 150. Take the disk array group 140-1 as an example, in some embodiments, the recovery management module 230 can record the second configuration information in the disk array group 140-1 via the storage resource pool management module 280. In some embodiments, the recovery management module 230 can first initialize the second configuration information and then record the information about the storage resource pool 150 and all of the disk array groups 140 included therein.

Figure 4B:
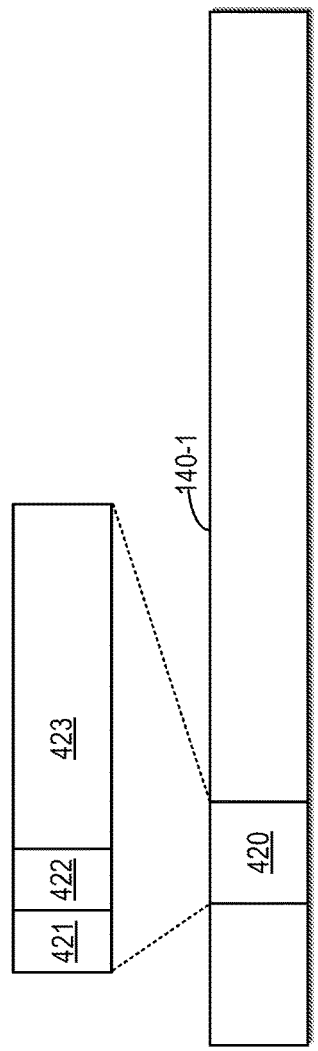

FIG. 4B illustrates a schematic diagram of the second configuration information 420 recorded in the disk array group 140-1 according to embodiments of the present disclosure. For example, the second configuration information 420 can be stored at a predetermined address in the disk array group 140-1 (such as in one or more predetermined stripes). In some embodiments, a predetermined size (for example, 4 kilobytes) of space may be allocated at the predetermined address of the disk array group 140-1 for storing the second configuration information 420. As shown in FIG. 4B, the second configuration information 420, for example, may include a unique identifier 421 of the storage resource pool 150, a unique identifier of the disk array group 140-1 and one or more identifiers 423 of other disk array groups 140 included in the storage resource pool 150. When data recovery is performed on the storage system, the second configuration 420 can be used for recovering the storage resource pool 150.

Returning to FIG. 3, at block 330, the recovery management module 230 may record the first configuration information in each of the disks 130 included in the disk array group 140. Take the disk 130-1 as an example, in some embodiments, the recovery management module 230 can record the first configuration information in the disk 130-1 via the disk array group management module 290. For example, the first configuration information can indicate the disk array group 140-1 including the disk 130-1 and all of the disks 130 included in the disk array group 140-1.

Figure 4C:
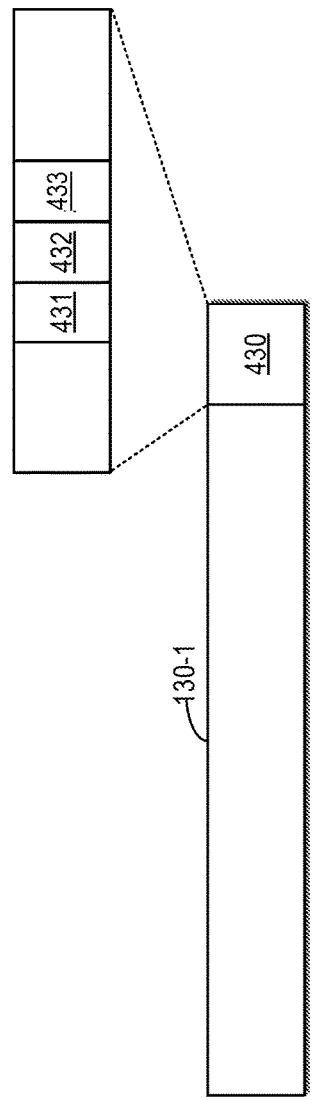

FIG. 4C illustrates a schematic diagram of the first configuration information 430 recorded in the disk 130-1 according to embodiments of the present disclosure. For example, the first configuration information 430 can be stored in a Disk Data Format (DDF) structure of the disk 130-1. The DDF structure is a standard data structure, which records complete configuration information of the disk array group 140-1 to which the disk 130-1 belongs. As shown in FIG. 4C, the first configuration information 430 includes one or more physical disk (PD) record items 431, which record information of all of the physical disks 130 included in the disk array group 140-1. The first configuration information 430 also includes one or more virtual disk (VD) record items 432, which record information of the disk array group 140 (such as the type of the disk array group 140-1 and the like). The first configuration information 430 may also include one or more configuration items 433, which record relationships between the physical disks 130 and the disk array group 140-1. When data recovery is performed on the storage system, the first configuration information 430 can be used for recovering the disk array group 140-1.

Returning to FIG. 3, at block 340, the recovery management module 230 may determine whether the configuration is updated. In some embodiments, the recovery management module 230 can determine, based on information obtained from the UI adapter 240 and/or the configuration listener 250, whether the configuration update exists. For example, the configuration update can include creation, updating and destroying of various storage objects etc.

If the recovery management module 230 determines that such configuration update exists, the recovery management module 230 may update at least one of the first, second and third configuration information at block 350. If the recovery management module 230 determines that such configuration update does not exist or after the block 340 is executed, the method 300 may return to block 340, so as to continue monitoring whether the configuration update exists.

Figure 5:
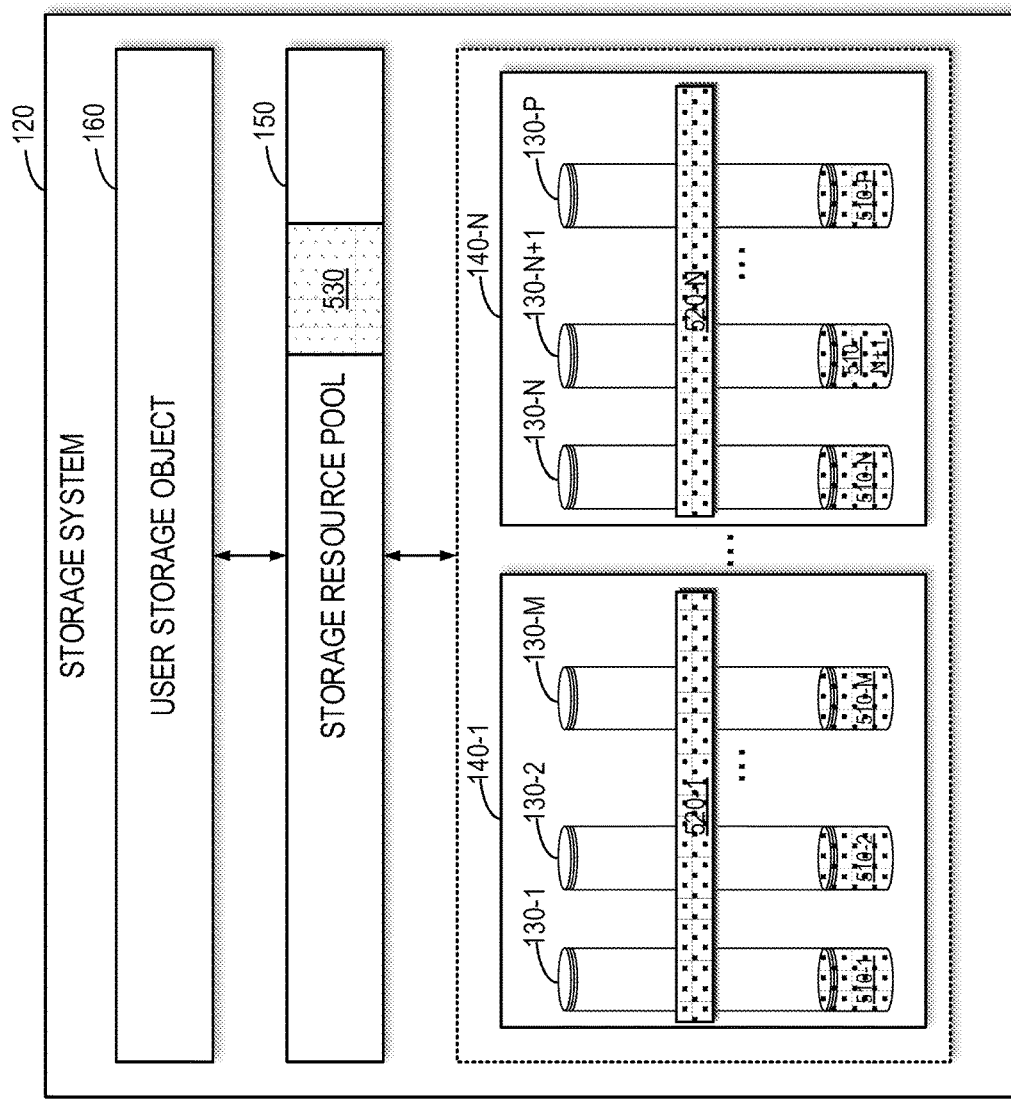
FIG. 5 illustrates a schematic diagram of corresponding configuration information for various levels of storage objects of the storage system being distributed at the various levels of storage objects according to embodiments of the present disclosure.

FIG. 5 illustrates a schematic diagram of corresponding configuration information for various levels of storage objects of the storage system being distributed at the various levels of storage objects according to embodiments of the present disclosure. As shown in FIG. 5, the first configuration information 510-1, 510-2 . . . 510-M . . . 510-N, 510-N+1 . . . 510-P describing relationships between each of the disks 130 and each of the disk array groups 140 is separately stored in respective DDF sectors of the disks 130-1, 130-2 . . . 130-M . . . 130-N, 130-N+1 . . . 130-P. The second configuration information 520-1 . . . 520-N describing relationships between each of the disk array groups 140 and the storage resource pool 150 is separately stored in the disk array groups 140-1 . . . 140-N, respectively. The third configuration information 530 describing relationships between the storage resource pool 150 and the user storage objects 160 is stored in the storage resource pool 150.

In this way, while creating and updating various levels of storage objects in the storage system 120, in addition to storing corresponding configuration information in the configuration database 220 via the UI module 210 as described above, the corresponding configuration information is also dispersedly recorded in the various levels of storage objects for use in data recovery. For example, when the operating system that manages the storage system is reinstalled due to breakdown or when a storage device in the storage system is moved to another storage system with the same architecture, it may cause the configuration information in the configuration database to be invalid (such as lost or unavailable)). At this time, the user of the storage system can trigger the recovery mode of the recovery management module 230 via the UI module 210 to recover the data in the storage system.

Figure 6:
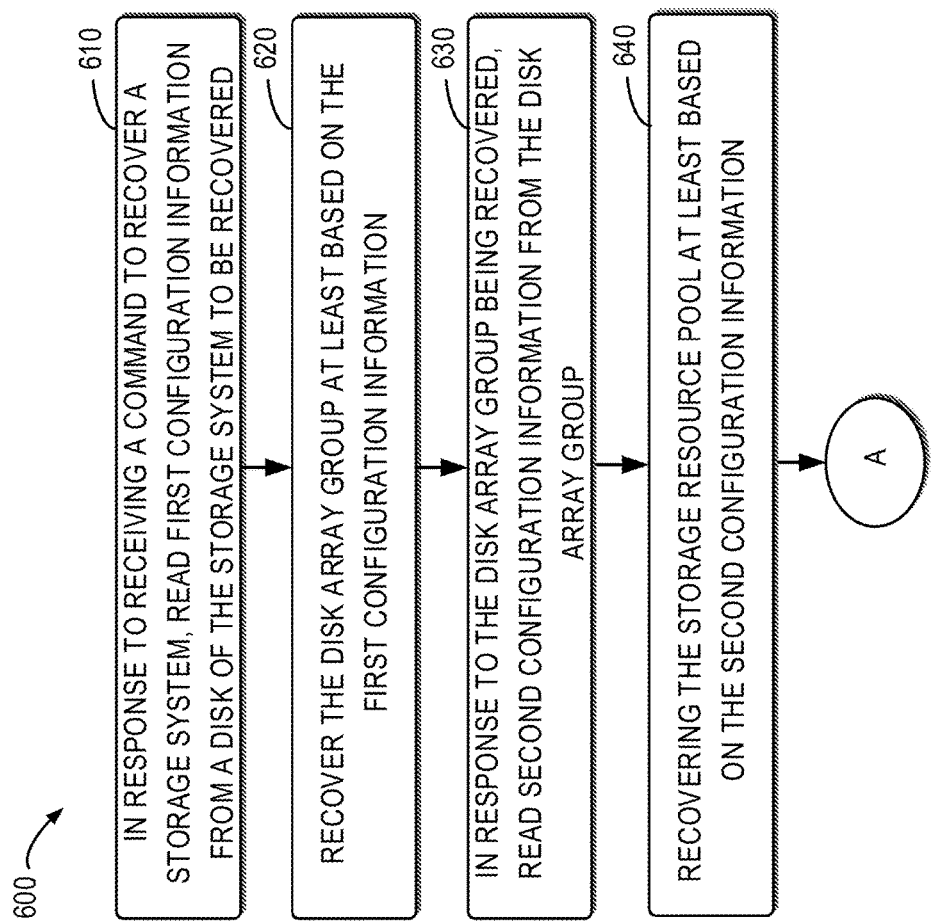
FIG. 6 illustrates a flowchart of a method for managing a storage system according to embodiments of the present disclosure.

FIG. 6 illustrates a flowchart of a method 600 for managing a storage system according to embodiments of the present disclosure. For example, the method 600 can be executed by the storage manager 110 as shown in FIGS. 1 and 2. Specifically, the method 600, for example, can be executed by the recovery management module 230 in the recovery mode. It is to be understood that the method 600 may also include additional acts not shown and/or omit some acts as shown, and the scope of the present disclosure is not limited in this regard. The method 600 will be described in detail with reference to FIGS. 2 and 5.

At block 610, in response to receiving a command to recover the storage system, the recovery management module 230 reads the first configuration information from the disk 130 in the storage system to be recovered.

In some embodiments, for example, the user can initiate a data recovery operation via the UI module as shown in FIG. 2 and the command about the recovery operation can be transmitted to the recovery management module 230 via the UI adapter 240. In response to receiving the command, the recovery management module 230 may read the first configuration information from the disk 130 in the storage system to be recovered.

In some embodiments, the first configuration information can indicate a disk array group to which the disk 130 belongs. Take the disk 130-1 as an example. In some embodiments, as shown in FIG. 5, the recovery management module 230 can read the first configuration information 510-1 from the DDF sector of the disk 130-1. The first configuration information 510-1, for example, may indicate that the disk 130-1 belongs to the disk array group 140-1. Additionally, the first configuration information 510-1 may also indicate the type of the disk array group 140-1 and other disks 130 (i.e., the disks 130-1 . . . 130-M) included in the disk array group 140-1.

At block 620, the recovery management module 230 recovers the disk array group 140-1 based at least on the first configuration information.

In some embodiments, the recovery management module 230 may determine whether the disks 130-2 . . . 130-M in the disk array group 140-1 exist. Then, the recovery management module 230 may determine, based on the determined result and the type of the disk array 140-1, whether the disk array 140-1 is recoverable. For example, assuming that the disk array 140-1 is RAID 5, at most one disk loss is tolerated. If the recovery management module 230 determines that more than one of the disks 130-1, 130-2 . . . 130-M (e.g., M=5) are missing, the recovery management module 230 can determine that the disk array group 140-1 is unrecoverable. If the recovery management module 230 determines that only one of the disks 130-1, 130-2 . . . 130-M (e.g., M=5) is missing or no disk in the disks 130-1, 130-2 . . . 130-M (e.g., M=5) is missing, the recovery management module 230 can determine that the disk array group 140-1 is recoverable. In some embodiments, if the disk array group 140-1 is determined as recoverable, the recovery management module 230 can rebuild the disk array group 140-1 based on the first configuration information.

At block 630, in response to the disk array group 140-1 being recovered, the recovery management module 230 reads the second configuration information from the disk array group 140-1.

As shown in FIG. 5, for example, the recovery management module 230 can read the second configuration information 520-1 from the disk array group 140-1. In some embodiments, the second configuration information can indicate the storage resource pool 150 to which the disk array group 140-1 belongs and other disk array groups (such as the disk array groups 140-2 . . . 140-N) included in the storage resource pool 150.

At block 640, the recovery management module 230 recovers the storage resource pool 150 based at least on the second configuration information.

In some embodiments, the recovery management module 230 can recover the disk array groups 140-2 . . . 140-N in a way similar to the recovery of the disk array group 140-1. The recovery management module 230 may determine whether the disk array group 140-2 . . . 140-N is recovered or not. If any of the disk array groups 140-1, 140-2 . . . 140-N is unrecoverable, the recovery management module 230 may mark the storage resource pool as unrecoverable. If all of the disk array groups 140-1, 140-2 . . . 140-N are recovered, the recovery management module 230 can mark the storage resource pool 150 as recoverable.

In this way, when the recovery management module 230 determines that the storage resource pool is recoverable, the recovery management module 230 can recover the storage resource pool 150. In some embodiments, when the storage resource pool 150 is marked as recoverable, the recovery management module 230 can recover the storage resource pool 150 and the user storage objects 160 created thereon by executing the replay operation.

Figure 7:
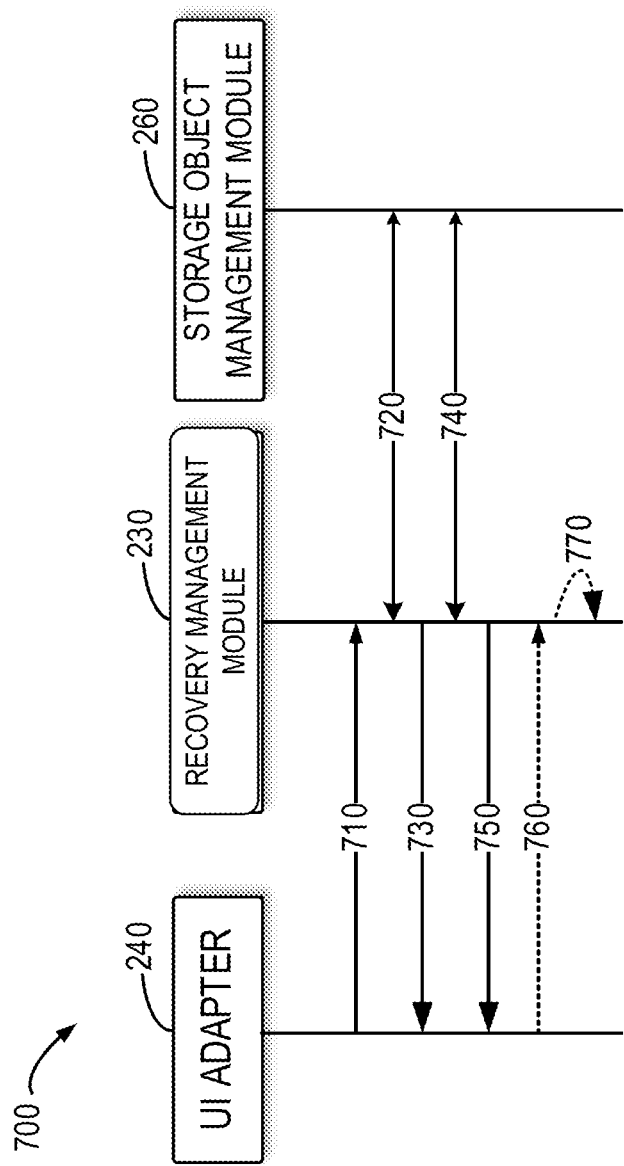
FIG. 7 illustrates a flowchart of an example process of a replay operation according to embodiments of the present disclosure.

FIG. 7 illustrates a flowchart of an example process 700 of the replay operation according to embodiments of the present disclosure. The process 700 will be described with reference to FIGS. 2 and 5. For the purpose of illustration, FIG. 7 only illustrates the UI adapter 240, the recovery management module 230 and the storage object management module 260 as shown in FIG. 2.

When the user finds that the storage resource pool 150 is marked as recoverable, the user may initiate the replay operation for the storage resource pool 150 via the UI module 120 as shown in FIG. 2. The command for the replay operation can be transmitted 710 to the recovery management module 230 by the UI adapter 240. In response to receiving the command, the recovery management module 230 may obtain 720, from the storage object management module 260 (e.g., the storage resource pool management module 280 and the disk array group management module 290), configuration information associated with the storage resource pool 150, such as the first and/or second configuration information. In this way, the recovery management module 230 can obtain information about properties of the storage resource pool 150, disk array groups and disks included therein. The recovery management module 230 can transmit 730 the obtained information to the UI adapter 240, which can update the configuration database 220 with the information by invoking the corresponding API to rebuild the storage resource pool 150. After the storage resource pool 150 is rebuilt, the recovery management module 230 may obtain 740, from the user storage object management module 270 in the storage object management module 260, configuration information related to the user storage objects 160 created on the storage resource pool 150, such as the third configuration information. Similarly, the recovery management module 230 can transmit 750 the obtained information to the UI adapter 240, which may update the configuration database 220 with the information by invoking the corresponding API to recover the user storage objects 160. Additionally or alternatively, when any of the updates to the configuration database 220 fails, the user may initiate a retry operation or a rollback operation via the UI module 210 as shown in FIG. 2, and the command for the retry operation or the rollback operation can be transmitted 760 to the recovery management module 230 by the UI adapter 240. In response to receiving such command, the recovery management module 230 can execute corresponding operations 770. For example, in response to receiving the command for the retry operation, the recovery management module 230 may reuse corresponding configuration information to re-update the configuration database 220 via the UI adapter. In response to receiving the command for the rollback operation, the recovery management module 230 can roll back the storage system 120 to the state prior to data recovery. For example, any of the storage objects, such as storage resource pool, user storage objects and the like, that have been updated to the configuration database 120 will be reverted to the state before the updates.

Figure 8:
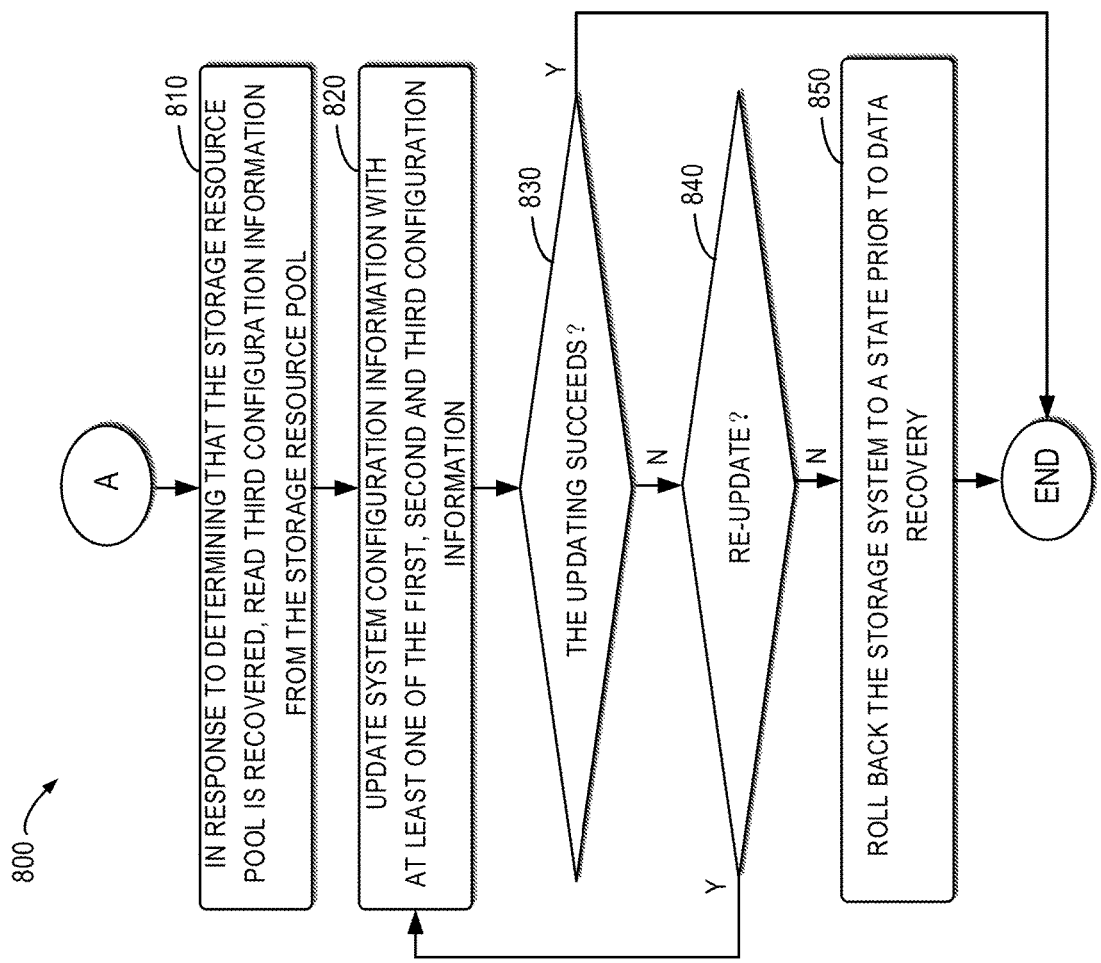
FIG. 8 illustrates a flowchart of a method for managing a storage system according to embodiments of the present disclosure.

FIG. 8 illustrates a flowchart of a method 800 for managing a storage system according to embodiments of the present disclosure. For example, the method 800 may be executed by the storage manager 110 as shown in FIGS. 1 and 2. Specifically, the method 800, for example, may be executed by the recovery management module 230 after the method 600, which corresponds to the process 700 as shown in FIG. 7. It is to be understood that the method 800 may also include additional acts not shown and/or omit some acts as shown, and the scope of the present disclosure is not limited in this regard. The method 800 will be described in detail with reference to FIGS. 2 and 5.

At block 810, in response to determining that the storage resource pool 150 is recovered, the recovery management module 230 reads the third configuration information from the storage resource pool 150. In some embodiments, the third configuration information indicates the user storage object 160 to be recovered on the storage resource pool 150. Examples of the user storage object 160 may include, but are not limited to, a LUN and a file system created based on the storage resource pool 150.

At block 820, the recovery management module 230 may update the system configuration information stored in the configuration database 220 with at least one of the first, second and third configuration information.

At block 830, the recovery management module 230 can determine whether the updating succeeds. If the updating fails, the recovery management module 230 may decide whether to re-update the configuration database 220 at block 840. If the recovery management module 230 decides to re-update the configuration database 220, the method may proceed to block 820 to re-update the configuration database 220 with at least one of the first, second and third configuration information. If the recovery management module 230 decides not to re-update the database 220, the method 800 can proceed to block 850, where the recovery management module 230 may roll back the storage system to the state prior to data recovery.

It can be seen from the above description that, while creating and updating various levels of storage objects in the storage system, in addition to storing corresponding configuration information in the system database, embodiments of the present disclosure also dispersedly record the corresponding configuration information into the various levels of storage objects. For example, in the case that the operating system for managing the storage system crashes and then is reinstalled, although the configuration information in the system database may be lost, embodiments of the present disclosure can still read the recorded corresponding configuration information from the storage device and recover the storage objects in the storage system level by level based on the read configuration information, as long as the data sector on the storage device is not severely damaged. Moreover, by updating the database of the operating system with the read configuration information, embodiments of the present disclosure can implement recovery for data in the entire storage system. In this way, when the operating system that manages the storage system is reinstalled, or the storage device in the storage system is moved to another storage system with the same architecture, user data and configuration information stored in the storage device can be recovered and rebuilt.

Figure 9:
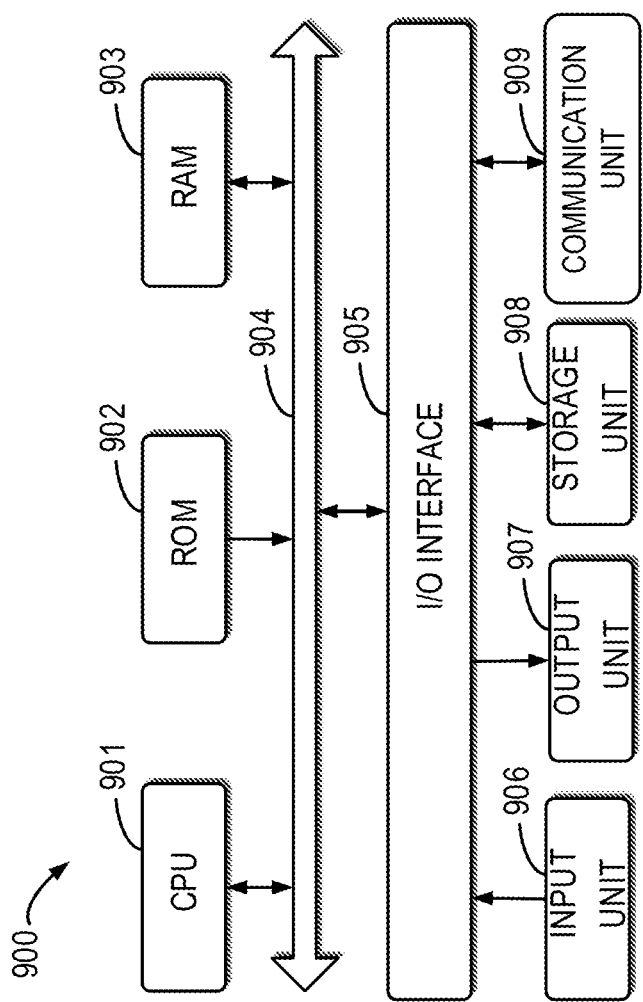
FIG. 9 illustrates a schematic block diagram of an example device for implementing embodiments of the present disclosure.

FIG. 9 illustrates a schematic block diagram of an example device 900 for implementing embodiments of the present disclosure. For example, the storage manager 110 shown by FIG. 1 can be implemented by the device 900. As shown, the device 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operation of the device 900. CPU 901, ROM 902 and RAM 903 are connected to each other via a bus 904. The input/output (I/O) interface 905 is also connected to the bus 904.

A plurality of components in the device 900 is connected to the I/O interface 905, including: an input unit 906, such as keyboard, mouse and the like; an output unit 907, e.g., various kinds of displays and loudspeakers etc.; a storage unit 908, such as disk and optical disk etc.; and a communication unit 909, such as network card, modem, wireless transceiver and the like. The communication unit 909 allows the device 900 to exchange information/data with other devices via the computer network, such as Internet, and/or various telecommunication networks.

The above described procedures and processing, such as the methods 300, 600 and/or 800, can also be executed by the processing unit 901. For example, in some embodiments, the methods 300, 600 and/or 800 can be implemented as a computer software program tangibly included in the machine-readable medium, e.g., storage unit 908. In some embodiments, the computer program can be partially or fully loaded and/or mounted to the device 900 via ROM 902 and/or communication unit 909. When the computer program is loaded to RAM 903 and executed by the CPU 901, one or more actions of the above described methods 300, 600 and/or 800 can be implemented.

The present disclosure includes methods, apparatus, systems and/or computer program products. A computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described herein with reference to flow charts and/or block diagrams of methods, apparatus (devices) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processor of general-purpose computer, dedicated computer or other programmable data processing apparatuses to manufacture a machine, such that the instructions, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, or other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by systems, methods and computer program products according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or to enable those ordinary skilled in the art to understand embodiments of the present disclosure.

What is claimed is:

1. A method for managing a storage system, comprising:
   in response to receiving a command to recover a storage system, reading first configuration information from a first disk of the storage system to be recovered, the first configuration information indicating a first disk array group to which the first disk belongs;
   recovering the first disk array group based at least on the first configuration information;
   in response to the first disk array group being recovered, reading second configuration information from the first disk array group, the second configuration information indicating a storage resource pool to which the first disk array group belongs; and
   recovering the storage resource pool based at least on the second configuration information.

2. The method of claim 1, wherein reading the first configuration information from the first disk comprises:
   reading the first configuration information from a Disk Data Format (DDF) sector of the first disk.

3. The method of claim 1, wherein the first configuration information further indicates a type of the first disk array group and a second disk included in the first disk array group, and recovering the first disk array group comprises:
   determining whether the second disk exists;
   determining, based on a result of the determining and the type of the first disk array group, whether the first disk array group is recoverable; and
   in response to determining that the first disk array group is recoverable, recovering the first disk array group.

4. The method of claim 1, wherein the second configuration information further indicates a second disk array group to be recovered in the storage resource pool, and recovering the storage resource pool comprises:
  recovering the second disk array group; and
  in response that the first and second disk array groups are recovered, determining the storage resource pool as recoverable.

5. The method of claim 4, wherein recovering the storage resource pool further comprises:
  in response to determining that at least one of the first and second disk array groups is unrecovered, determining the storage resource pool as unrecoverable.

6. The method of claim 4, wherein the method further comprises:
  in response to determining the storage resource pool as recoverable, reading third configuration information from the storage resource pool, the third configuration information indicating a user storage object to be recovered on the storage resource pool; and
  recovering the user storage object based at least on the third configuration information.

7. The method of claim 6, wherein the user storage object includes at least one of a logic storage unit and a file system created based on the storage resource pool.

8. The method of claim 6, wherein recovering the user storage object comprises:
  updating configuration information of the storage system with at least one of the first, second and third configuration information.

9. The method of claim 8, wherein recovering the user storage object further comprises, in response to a failure of the updating, performing any of the following:
  re-updating configuration information of the storage system with at least one of the first, second and third configuration information; and
  rolling back the storage system to a state prior to the recovery.

10. A computer program product tangibly stored in a non-transitory, computer-readable storage medium and including machine executable instructions, the machine executable instructions, when executed by a device, causing the device to carry out the method of claim 1.

11. A method for managing a storage system, comprising:
  in response to creating a storage resource pool in a storage system, recording third configuration information in the storage resource pool, the third configuration information indicating a user storage object created on the storage resource pool, the storage resource pool including at least a disk array group, and the disk array group including at least one disk;
  recording second configuration information in the disk array group, the second configuration information indicating the storage resource pool including the disk array group and another disk array group included in the storage resource pool;
  recording first configuration information in the at least one disk, the first configuration information indicating the disk array group including the at least one disk; and
  in response to receiving an indication of configuration update in the storage system, updating at least one of the first, second and third configuration information.

12. A computer program product tangibly stored in a non-transitory, computer-readable storage medium and including machine executable instructions, the machine executable instructions, when executed by a device, causing the device to carry out the method of claim 11.

13. A device for managing a storage system, comprising:
  at least one processing unit;
  at least one memory coupled to the at least one processing unit and storing instructions for execution by the at least one processing unit, the instructions, when executed by the at least one processing unit, causing the device to perform acts including:
    in response to receiving a command to recover a storage system, reading first configuration information from a first disk of the storage system to be recovered, the first configuration information indicating a first disk array group to which the first disk belongs;
    recovering the first disk array group based at least on the first configuration information;
    in response to the first disk array group being recovered, reading second configuration information from the first disk array group, the second configuration information indicating a storage resource pool to which the first disk array group belongs; and
    recovering the storage resource pool based at least on the second configuration information.

14. The device of claim 13, wherein reading the first configuration information from the first disk comprises:
  reading the first configuration information from a Disk Data Format (DDF) sector of the first disk.

15. The device of claim 13, wherein the first configuration information further indicates a type of the first disk array group and a second disk included in the first disk array group, and recovering the first disk array group comprises:
  determining whether the second disk exists;
  determining, based on a result of the determining and the type of the first disk array group, whether the first disk array group is recoverable; and
  in response to determining that the first disk array group is recoverable, recovering the first disk array group.

16. The device of claim 13, wherein the second configuration information further indicates a second disk array group to be recovered in the storage resource pool, and recovering the storage resource pool comprises:
  recovering the second disk array group; and
  in response that the first and second disk array groups are recovered, determining the storage resource pool as recoverable.

17. The device of claim 16, wherein recovering the storage resource pool further comprises:
  in response to determining that at least one of the first and second disk array groups is unrecovered, determining the storage resource pool as unrecoverable.

18. The device of claim 16, wherein the acts further include:
  in response to determining the storage resource pool as recoverable, reading third configuration information from the storage resource pool, the third configuration information indicating a user storage object to be recovered on the storage resource pool; and
  recovering the user storage object based at least on the third configuration information.

19. The device of claim 18, wherein the user storage object includes at least one of a logic storage unit and a file system created based on the storage resource pool.

20. The device of claim 18, wherein recovering the user storage object comprises:
  updating configuration information of the storage system with at least one of the first, second and third configuration information.

21. The device of claim 20, wherein recovering the user storage object further comprises, in response to a failure of the updating, performing any of the following:
- re-updating configuration information of the storage system with at least one of the first, second and third configuration information; and
- rolling back the storage system to a state prior to the recovery.

22. A device for managing a storage system, comprising:
- at least one processing unit;
- at least one memory coupled to the at least one processing unit and storing instructions for execution by the at least one processing unit, the instructions, when executed by the at least one processing unit, causing the device to perform acts including:
  - in response to creating a storage resource pool in a storage system, recording third configuration information in the storage resource pool, the third configuration information indicating a user storage object created on the storage resource pool, the storage resource pool including at least a disk array group, and the disk array group including at least one disk;
  - recording second configuration information in the disk array group, the second configuration information indicating the storage resource pool including the disk array group and another disk array group included in the storage resource pool;
  - recording first configuration information in the at least one disk, the first configuration information indicating the disk array group including the at least one disk; and
  - in response to receiving an indication of configuration update in the storage system, updating at least one of the first, second and third configuration information.

* * * * *